United States Patent
Ikeda et al.

(10) Patent No.: US 7,773,261 B2
(45) Date of Patent: Aug. 10, 2010

(54) SETTING OF COLOR PROCESSING PARAMETERS FOR DIGITAL IMAGING APPARATUS

(75) Inventors: Masami Ikeda, Kawasaki (JP); Soichi Hagiwara, Kawasaki (JP); Ryuji Iwamoto, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 394 days.

(21) Appl. No.: 11/878,497

(22) Filed: Jul. 25, 2007

(65) Prior Publication Data

US 2008/0043267 A1    Feb. 21, 2008

(30) Foreign Application Priority Data

Aug. 16, 2006    (JP) .............................. 2006-221954

(51) Int. Cl.
*G06F 15/00* (2006.01)
(52) U.S. Cl. ....................................... 358/1.9; 382/162
(58) Field of Classification Search ................. 358/1.9; 382/162

See application file for complete search history.

(56) References Cited

U.S. PATENT DOCUMENTS

2004/0090534 A1* 5/2004 Nakami et al. ........... 348/220.1
2005/0063585 A1* 3/2005 Matsuura .................... 382/162

FOREIGN PATENT DOCUMENTS

JP    2004-120541 A    4/2004
JP    2006-148435 A    6/2006

* cited by examiner

*Primary Examiner*—Twyler L Haskins
*Assistant Examiner*—Michael Burleson
(74) *Attorney, Agent, or Firm*—Fujitsu Patent Center

(57) ABSTRACT

A method of setting color processing parameters for a digital imaging apparatus includes connecting a computer via a communication path to a digital imaging apparatus that produces color image data through color processing performed by a color processing unit on image data taken by an imaging device, setting, in the computer, parameters for use in the color processing, transferring the parameters from the computer to the digital imaging apparatus via the communication path, causing the color processing unit to perform color processing based on the parameters under control of an emulator that operates in the digital imaging apparatus, and storing, in memory, color image data generated by the color processing based on the parameters.

14 Claims, 5 Drawing Sheets

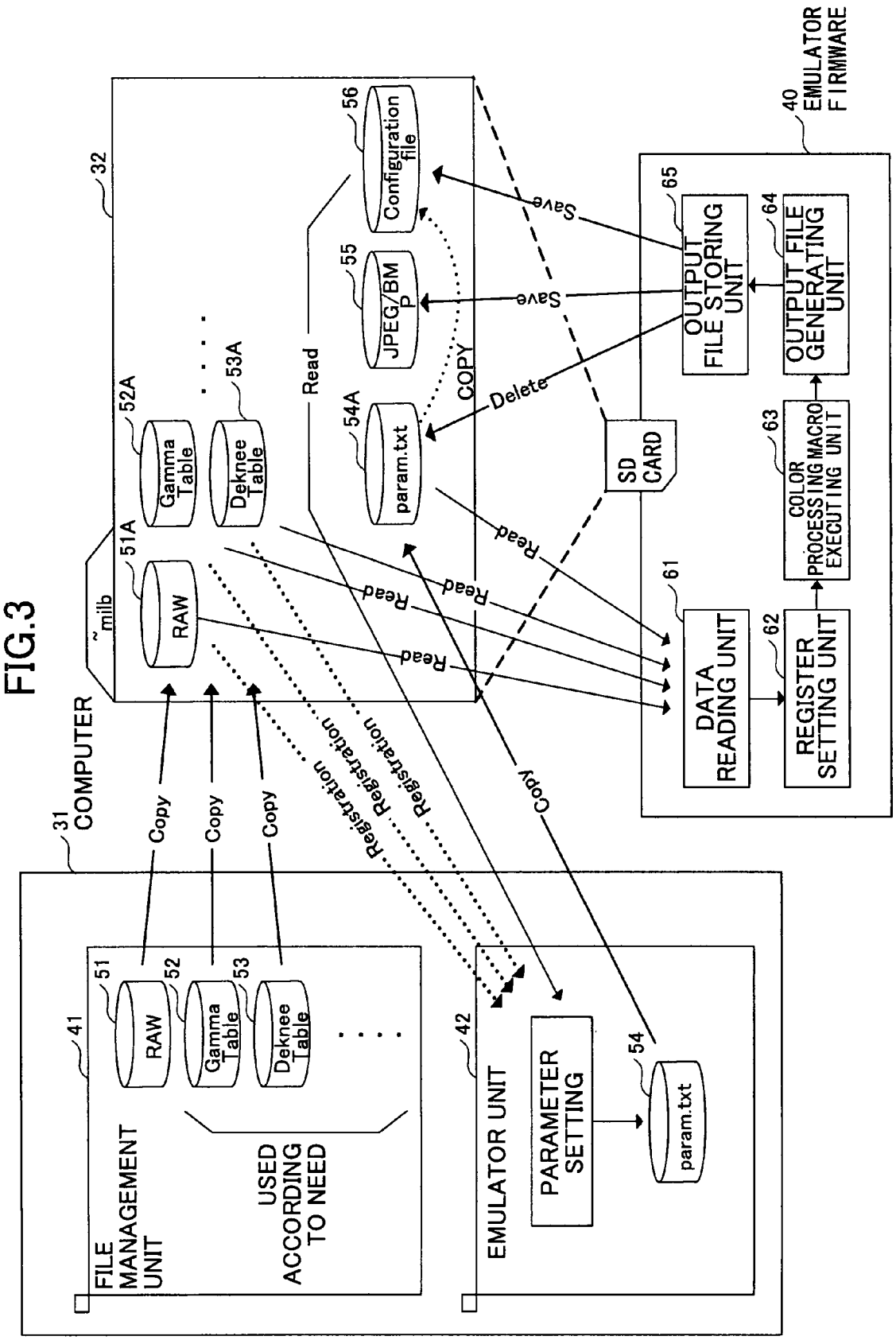

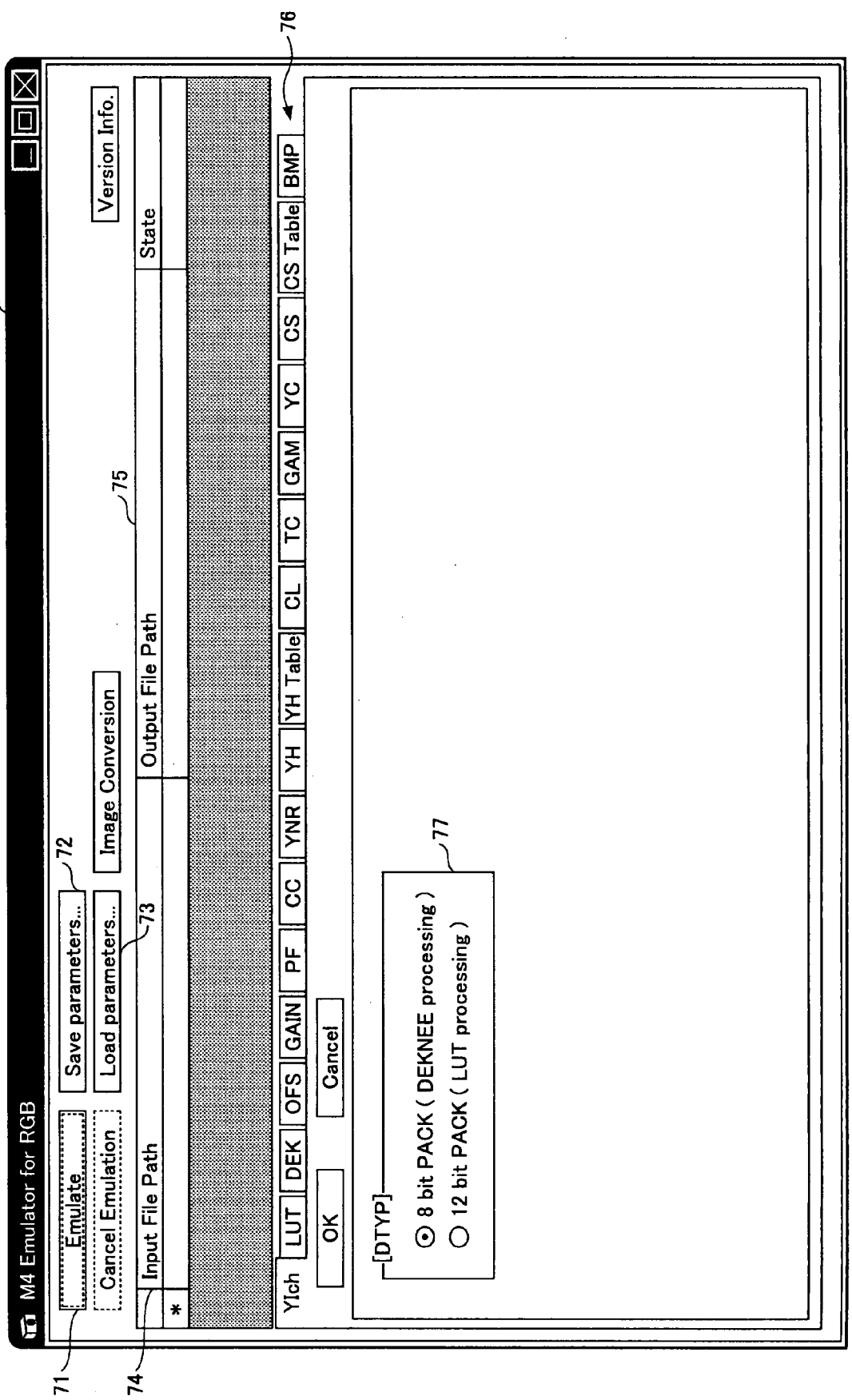

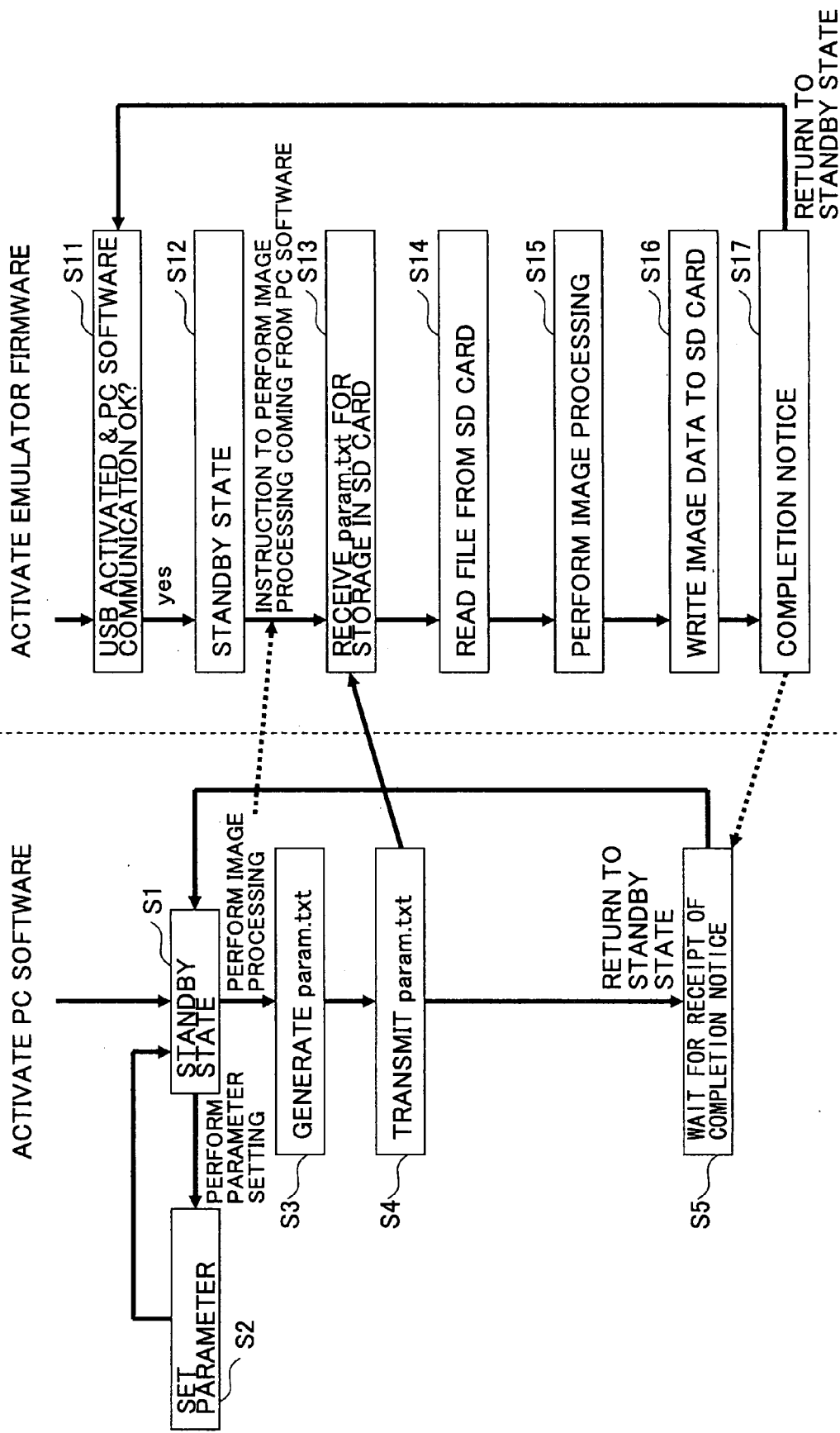

SETTING OF COLOR PROCESSING PARAMETERS FOR DIGITAL IMAGING APPARATUS

CROSS-REFERENCE TO RELATED APPLICATIONS

The present application is based upon and claims the benefit of priority from the prior Japanese Patent Application No. 2006-221954 filed on Aug. 16, 2006, with the Japanese Patent Office, the entire contents of which are incorporated herein by reference.

BACKGROUND OF THE INVENTION

1. Field of the Invention

The present invention generally relates to digital imaging apparatuses, and particularly relates to a method of setting parameters for use in the color processing of images taken by a digital imaging apparatus.

2. Description of the Related Art

In digital cameras, a color filter comprised of a Bayer array in which the three primary colors R (red), G (green), and B (blue) are arranged is placed in front of the solid-state imaging device such as a CCD sensor or CMOS sensor, so that light passing through the color filter is broken down into color components. In such a Bayer array, every four pixels having two pixels in height and two pixels in width are taken as a set in the pixel matrix of the imaging device, and is configured to include two green pixels, one red pixel, and one blue pixel. Since the sensitivity of human vision is high with respect to the luminance of green component, the proportion of green pixels in the Bayer array is set high in order to enhance luminance resolution.

Data obtained immediately after passing through the Bayer array is referred to as raw data. Color processing (also referred to as "development") is performed on the raw data to generate RGB image data.

If the number of pixels of the imaging device is M×N pixels, the pixel value of a pixel of interest needs to be derived through interpolation using the pixel values of surrounding pixels around the pixel of interest in order to generate a RGB color image of M×N pixels. Color interpolation processing based on an interpolation algorithm is performed on each pixel so as to generate RGB image data from raw data.

In color processing, rounding error (quantization error) occurs during the computation, resulting in a shift in hue. Such hue shift may be suppressed by performing the color processing under optimum image conditions based on the adjustment of white balance and luminance.

An interpolation algorithm and various parameters (e.g., parameters used in the algorithm, white balance, luminance, and so on) for color processing are stored as color processing firmware in a ROM inside a digital camera. The image processing LSI executes this firmware at the time of imaging so as to generate color image. The algorithm and various parameters for color processing greatly affect the quality of color images taken by a digital camera. Digital camera manufacturers thus compete against each other in terms of the superiority of image quality by using uniquely developed algorithms.

When digital camera products are developed, the above-mentioned various parameters are adjusted at the final-stage of development in order to achieve beautiful color image quality. In this adjustment, raw data obtained by using a real digital camera is transferred to a computer such as a personal computer via a communication path such as a USB. The computer performs software-based color processing to generate a color image, which is then visually inspected to adjust the various parameters. The color processing software used in this process is designed to simulate the color processing to be embedded in the digital camera product that is being developed.

When the various parameters are determined, the determined parameters are written to the ROM inside the digital camera. The digital camera is then actually used to take and develop images so that the final check of image quality is performed.

The method of parameter adjustment described above has a problem in that the color processing algorithm that is preferably kept as secret from outside the company is turned into software, so that the details of the color processing algorithm can be analyzed from the color processing software. Further, the speed of image processing by use of color processing software is extremely lower than the speed of image processing by use of an image processing LSI. Processing that is completed in one second for one image by use of an image processing LSI may take longer than one minute if it is performed by use of color processing software. Further, there is a problem in that the labor to turn a complex color processing algorithm into software is necessary.

In order to obviate the problems described above, the ROM of the digital camera that stores color processing firmware may be rewritten to set various parameters, and, then, imaging and image quality evaluation are performed, followed by readjusting the various parameters based on the image quality evaluation. Such method, however, requires a significant amount of time and labor since a sequence of imaging, image quality evaluation, modification to the firmware, and rewriting of the ROM needs to be performed several times.

Accordingly, there is a need for a digital camera and method of setting color processing parameters that allow parameters regarding color processing to be adjusted with a small amount of time and labor.

[Patent Document 1] Japanese Patent Application Publication No. 2004-120541

SUMMARY OF THE INVENTION

It is a general object of the present invention to provide a digital camera and method of setting color processing parameters that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a digital camera and method of setting color processing parameters particularly pointed out in the specification in such full, clear, concise, and exact terms as to enable a person having ordinary skill in the art to practice the invention.

To achieve these and other advantages in accordance with the purpose of the invention, the invention provides a method of setting color processing parameters for a digital imaging apparatus, which includes connecting a computer via a communication path to a digital imaging apparatus that produces color image data through color processing performed by a color processing unit on image data taken by an imaging device, setting, in the computer, parameters for use in the color processing, transferring the parameters from the computer to the digital imaging apparatus via the communication path, causing the color processing unit to perform color processing based on the parameters under control of an emulator that operates in the digital imaging apparatus, and storing, in memory, color image data generated by the color processing based on the parameters.

According to another aspect of the present invention, a digital imaging apparatus for producing color image data through color processing performed by a color processing unit on image data taken by an imaging device is configured to cause an embedded processor to perform storing, in predetermined registers, parameters for use in the color processing received from a computer connected via a communication path, causing the color processing unit to perform color processing based on the parameters stored in the predetermined registers, and storing, in memory, color image data generated by the color processing based on the parameters.

According to another aspect of the present invention, a digital imaging apparatus includes an imaging device, a color processing unit configured to produce color image data by performing color processing on image data taken by the imaging device, a nonvolatile memory, a processor, and an emulator firmware stored in the nonvolatile memory and configured to cause the processor to perform storing, in predetermined registers, parameters for use in the color processing received from a computer connected via a communication path, causing the color processing unit to perform color processing based on the parameters stored in the predetermined registers, and storing, in memory, color image data generated by the color processing based on the parameters.

According to at least one embodiment of the present invention, the emulator firmware is embedded in a digital camera, which is connected to a computer, so that color processing is performed by use of the color processing unit of the image processing LSI of the digital camera based on parameters that are set in the computer. Accordingly, the color processing is performed at high speed based on the adjusted parameters, and, then, the color images are evaluated, thereby making it possible to adjust the parameters in a short time. Since the emulator firmware performs parameter settings for color processing, color processing (color interpolation processing) by use of the color processing unit, and file management with respect to a memory such as an SD card, the user labor associated with parameter adjustment can be reduced. Further, since all that is necessary to achieve this is to write the emulator firmware to the ROM of a digital camera, this configuration is achievable by use of standard functions that are provided in digital cameras.

BRIEF DESCRIPTION OF THE DRAWINGS

Other objects and further features of the present invention will be apparent from the following detailed description when read in conjunction with the accompanying drawings, in which:

FIG. 3 is a drawing for explaining parameter adjustment by use of the emulator firmware according to the present invention;

FIG. 4 is a drawing showing an example of the window for operating an emulator unit; and FIG. 5 is a flowchart showing the operations performed by the emulator firmware in the digital camera and the operations performed by the emulator unit in a computer.

DESCRIPTION OF THE PREFERRED EMBODIMENTS

In the following, embodiments of the present invention will be described with reference to the accompanying drawings.

Figure 1:
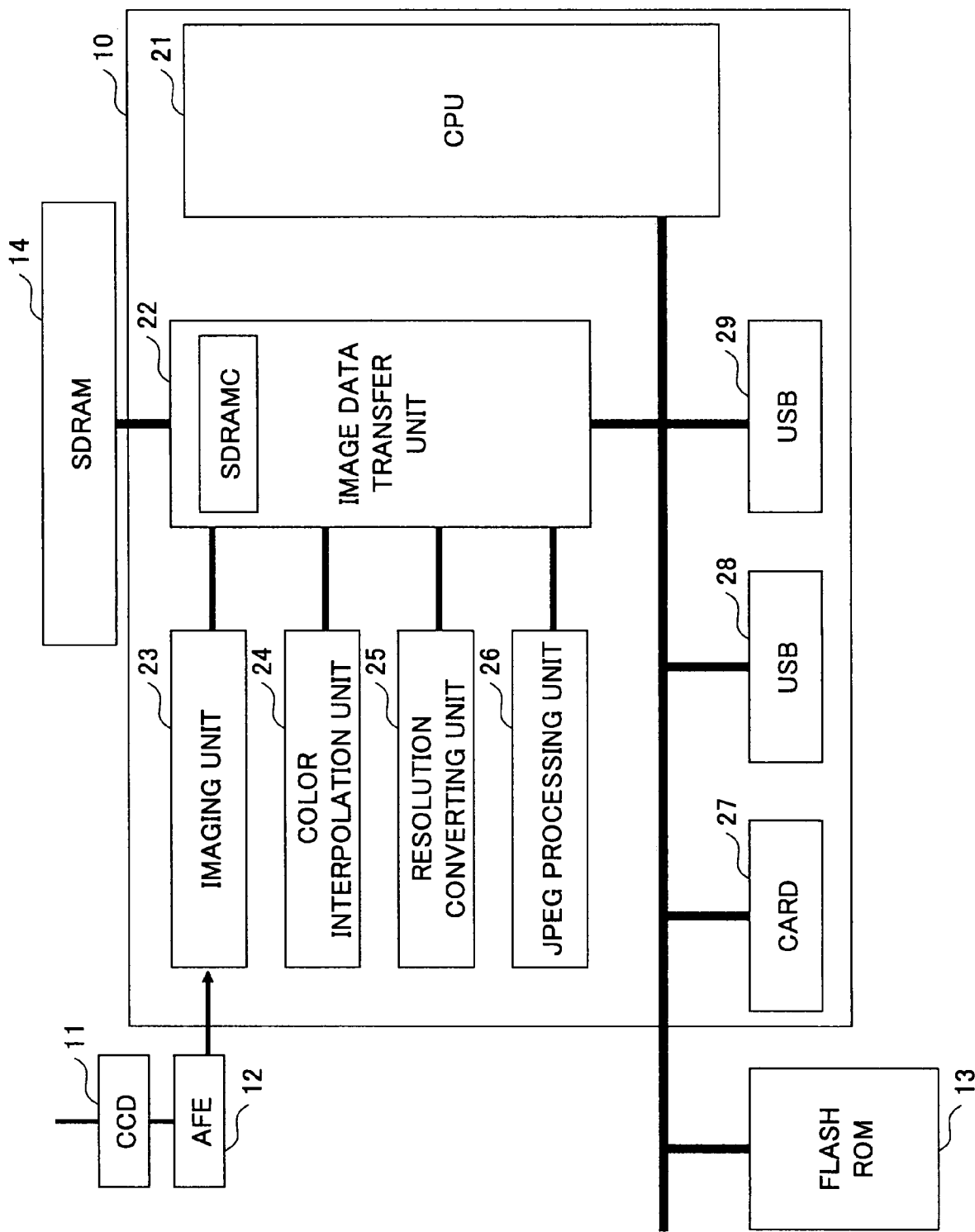
FIG. 1 is a drawing showing the configuration of an image processing system of a digital camera to which the present invention is applied.

FIG. 1 is a drawing showing the configuration of an image processing system of a digital camera to which the present invention is applied. The digital camera image processing system shown in FIG. 1 includes an image processing LSI 10, a solid-state imaging device 11 such as a CCD, an AFE (analog front end) 12, a flash ROM 13, and an SDRAM (synchronous dynamic random access memory) 14. The image processing LSI 10 includes a CPU 21, an image data transfer unit 22, an imaging unit 23, a color interpolation unit 24, a resolution converting unit 25, a JPEG processing unit 26, a card interface 27, and USB (Universal Serial Bus) interface 28.

The solid-state imaging device 11 supplies detected image signals as digital data to the AFE 12 together with a horizontal synchronizing signal, a vertical synchronizing signal, and a clock signal. The AFE 12 includes a dual-correlation-sampling circuit for removing noise, a variable gain circuit for adjusting gain, and an analog-to-digital converter for converting analog signals into digital signals. Digital image data output from the AFE 12 is loaded into the imaging unit 23 of the image processing LSI 10. The imaging unit 23 may perform defective pixel correction for correcting defects by processing the data of defective pixels present in the image signals, shading correction for correcting lens distortion based on color data, auto-white-balance processing, etc.

The image data processed by the imaging unit 23 is supplied via the image data transfer unit 22 to the color interpolation unit 24. In the color interpolation unit 24, the color processing processor performs color interpolation processing based on the firmware inclusive of color processing parameters stored in the flash ROM 13. This color interpolation processing converts Bayer-array-based raw data into RGB data so as to generate color images. This color processing may alternatively be configured to generate data of another color system such as a YUV color system instead of the RGB color system.

The resolution converting unit 25 performs the clipping of an image portion, the expansion of the clipped image portion, the size reduction of an image, and the like. This achieves a digital-zoom function, for example. The JPEG processing unit 26 compresses data by encoding bitmap-format image data into JPEG-format image data. The card interface 27 is an interface for communicating with a card medium such as an SD card (Secure Digital Memory Card). The USB interface 28 is an interface for communicating with a personal computer or the like through a USB bus.

These units provided in the image processing LSI 10 are controlled by the CPU 21. The image data transfer unit 22 includes an SDRAM controller (SDRAMC) for controlling data exchange with the SDRAM 14.

In the present invention, the flash ROM 13 stores parameter settings for color processing, color processing (color interpolation processing) program to be executed by the color interpolation unit 24, and emulator firmware for file management. The emulator firmware controls the operation of the image processing LSI 10 while communicating with an external computer, thereby making it possible to perform image quality evaluation and parameter adjustment by utilizing the color interpolation unit 24 that is color processing hardware actually embedded in the digital camera product that is being developed.

Figure 2:
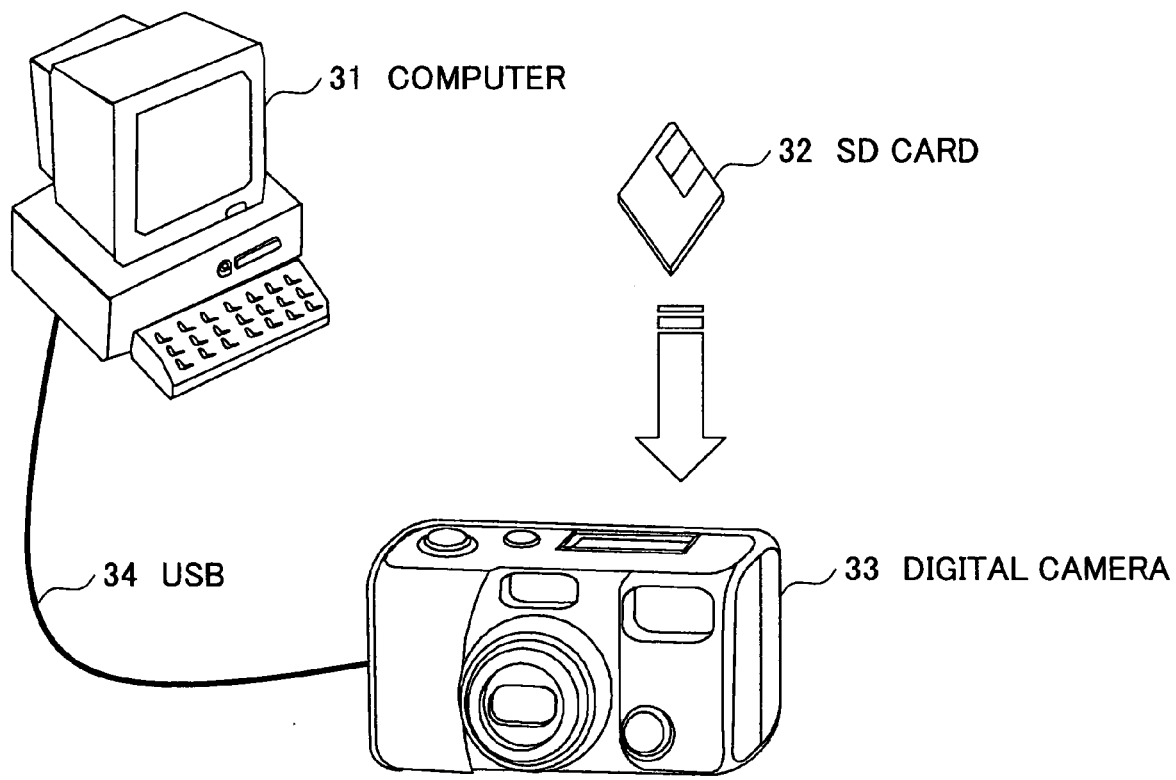
FIG. 2 is a drawing showing a system configuration in which emulator firmware is used to adjust parameters according to the present invention.

FIG. 2 is a drawing showing a system configuration in which the emulator firmware is used to adjust parameters according to the present invention. The parameter adjustment system shown in FIG. 2 includes a computer 31, an SD card 32, a digital camera 33, and a USB 34. The computer 31 and the digital camera 33 are connected via the USB 34 to communicate with each other. On the digital camera 33 side, the USB 34 is connected to the USB interface 28 shown in FIG. 1.

The SD card 32 is inserted into the digital camera 33. Various data such as raw data, color image data, and color processing parameters are exchanged between the computer 31 and the SD card 32. The SD card 32 is connected to the card interface 27 shown in FIG. 1.

FIG. 3 is a drawing for explaining parameter adjustment by use of the emulator firmware according to the present invention. In FIG. 3, the computer 31 such as a personal computer and the digital camera communicate with each other, so that various data are exchanged between the computer 31 and the SD card 32 attached to the digital camera.

A file management unit 41 such as Windows Explorer and an emulator unit 42 for setting color processing parameters are running on the computer 31. The file management unit 41 and emulator unit 42 are software that is executed by the processor of the computer 31.

Raw data 51, a gamma table 52, and a Deknee table 53 managed by the file management unit 41 are copied from the computer 31 to the SD card 32 according to need, and are stored as a raw data 51A, a gamma table 52A, and a Deknee table 53A. The raw data 51A may alternatively be data that is detected by the solid-state imaging device 11 of the digital camera 33 and stored in the SD card 32, rather than the data that is transferred from the computer 31 and stored in the SD card 32.

The raw data 51A, gamma table 52A, and Deknee table 53A are used in color processing performed by emulator firmware 40. The gamma table 52 is a table that shows input/output characteristics for gamma correction. The Deknee table 53 is used to perform Knee/Deknee processing that compresses data detected by the solid-state imaging device 11 for the purpose of reducing computation load during color processing and subsequently decompresses the data.

The user operating the computer 31 uses the emulator unit 42 to set the color processing parameters. Further, the user registers files (e.g., the raw data 51A, the gamma table 52A, and the Deknee table 53A) to be used, thereby identifying the raw data and tables used in the color processing. The color processing parameters determined through such operations are stored in the memory of the computer 31 as a file (param.txt) 54. The emulator unit 42 transfers the file 54 defining the color processing parameters to the digital camera 33 for storage as a file (param.txt) 54A in the SD card 32. The color processing parameters included in the file 54A are used in the color processing performed by the color interpolation unit 24 of the image processing LSI 10 of the digital camera 33.

The emulator firmware 40 is firmware (program) for performing parameter settings for color processing, color processing (color interpolation processing) by use of the color interpolation unit 24, and file management with respect to the SD card 32. The emulator firmware 40 is stored in the flash ROM 13 shown in FIG. 1, and is executed by the CPU 21 of the image processing LSI 10. A particular operation that is defined on a product-specific basis for each digital camera 33 is performed with respect to the digital camera 33 to set the emulator mode that executes the emulator firmware 40.

The emulator firmware 40 includes as functional blocks a data reading unit 61, a register setting unit 62, a color processing macro executing unit 63, an output file generating unit 64, and an output file storing unit 65. The data reading unit 61 reads the raw data 51A, the gamma table 52A, the Deknee table 53A, and the file (param.txt) 54A from the SD card 32. The register setting unit 62 makes settings to registers that are to be referred to by the color interpolation unit 24 when performing color interpolation processing in response to the contents of the file (param.txt) 54A. Namely, values responsive to the color processing parameters as defined in the file 54A are stored in the registers that are to be referred to by the color interpolation unit 24 when performing color interpolation.

The color processing macro executing unit 63 causes the color interpolation unit 24 to perform color processing. In so doing, the color interpolation unit 24 refers to the register values responsive to the color processing parameters stored in the above-noted registers so as to perform color processing based on these register values. Namely, the color processing parameters set by the user using the emulator unit 42 at the computer 31 are used in the color processing performed by the color interpolation unit 24. The output file generating unit 64 generates an output file that contains color image data generated by the color processing of the color interpolation unit 24.

The output file storing unit 65 stores the color image data output file in the SD card 32 as color image data 55. The file format of the color image data 55 may be the JPEG format or the bitmap format (BMP format). The output file storing unit 65 copies the file 54A transferred from the computer 31 for storage as a configuration file 56 in the SD card 32, and deletes the original file 54A.

The configuration file 56 may be referred to as reference data by the emulator unit 42 when determining the color processing parameters at the computer 31 next time. The contents of the configuration file 56 are the same as those of the file 54A, and are the list of the color processing parameters. While the file 54A is in the format readable by the emulator firmware 40, the configuration file 56 is in the format readable by the emulator unit 42. By referring to the configuration file 56, it is possible to learn the current parameter settings of the digital camera 33 even when the parameter settings are already deleted in the computer 31.

FIG. 4 is a drawing showing an example of the window for operating the emulator unit 42. An emulator operating window 70 is displayed on the display screen of the computer 31 upon the activation of the emulator unit 42. The user performs various operations on the emulator operating window 70 so as to execute parameter setting operations and the like.

The emulator operating window 70 mainly includes an emulate button 71, a parameter save button 72, a parameter load button 73, an input-file-path field 74, an output-file-path field 75, and a plurality of tabs 76. Upon clicking the emulate button 71 by the mouse, the color interpolation unit 24 performs color processing under the control of the emulator firmware 40 in the digital camera 33. The parameter save button 72 is used to write the file 54 to the SD card 32 as the file 54A. The parameter load button 73 is used to load the configuration file 56 from the SD card 32 to the computer 31.

The input-file-path field 74 displays the file path of the raw data 51A in the SD card 32. The output-file-path field 75 displays the file path of the color image data 55 in the SD card 32. The plurality of tabs 76 are used to set various color processing parameters. A tab corresponding to a desired color processing parameter is clicked among the plurality of tabs 76 so as to display an input field 77 in which this color processing parameter is to be set. In the displayed input field 77, operations such as the entering of data and the selecting of options are performed as appropriate, thereby making settings to the color processing parameter. In the example shown in FIG. 4, a setting is made such that data having a reduced number of bits through compression by the Knee/Deknee processing is subjected to color processing performed by the color interpolation unit 24 in order to reduce computation load at the time of color processing.

FIG. 5 is a flowchart showing the operations performed by the emulator firmware 40 in the digital camera 33 and the operations performed by the emulator unit 42 in the computer 31. The emulator firmware 40 and the emulator unit 42 operate independently of each other, and communicate with each other only as such a need arises, thereby performing an emulator operation of the present invention.

When the user activates the emulator unit 42 at the computer 31, the emulator unit 42 is placed in a standby state (step S1). When the emulator firmware 40 is activated in the digital camera 33 by the user performing a particular operation defined on a device-specific basis, the emulator firmware 40 checks whether the USB is active so that communication with the emulator unit 42 of the computer 31 is possible (step S11). If it is ascertained that the communication is possible, the emulator firmware 40 is placed in the standby state (step S12).

The user operates the emulator operating window 70 at the computer 31 to set a parameter (step S2). Upon the setting of the parameter, the emulator unit 42 is again placed in the standby state (step S1). Step S1 and step S2 are repeated, and desired parameters are successively selected to be set to desired values.

In the standby state of the emulator unit 42 (step S1), the user clicks the emulate button 71 of the emulator operating window 70. In response, an image processing execution instruction is transmitted to the emulator unit 42. In response to the image processing execution instruction, the emulator firmware 40 exits from the standby state (step S12).

The emulator unit 42 of the computer 31 generates the file 54 (param.txt) of FIG. 3 (step S3) in response to the contents of the color processing parameters set at step S2. Thereafter, the generated file 54 (param.txt) is transmitted via the USB 34 (FIG. 2) to the digital camera 33. After the transmission of the file, the emulator unit 42 enters the standby state to wait for the reception of a completion notice (step S5).

In the digital camera 33, the emulator firmware 40 receives the file 54 (param.txt), and stores it as the file 54A (param.txt) in the SD card 32 (step S13). The emulator firmware 40 then reads necessary files from the SD card 32 (step S14), and causes the color interpolation unit 24 to perform color processing (step S15) after making predetermined preparations (e.g., making settings to the registers and the like).

Upon the completion of the color processing by the color interpolation unit 24, the emulator firmware 40 writes the color image data 55 (see FIG. 3) generated by the color processing to the SD card 32 (step S16). Thereafter, the emulator firmware 40 transmits a completion notice to the emulator unit 42 of the computer 31 (step S17), and returns to step S11 to enter the standby state at step S12.

The emulator unit 42 of the computer 31 returns to step S1 to enter the standby state upon the receipt of the completion notice from the emulator firmware 40 of the digital camera 33.

In this state, the user displays the color image data 55 stored in the SD card 32 so as to perform image quality evaluation through visual inspection. In so doing, the image may be displayed on the image display unit of the digital camera 33. It may be preferable, however, to transfer the color image data 55 from the digital camera 33 to the computer 31 via the USB 34 so as to display the image on the display screen of the computer 31. Such data transfer can be performed by use of a data communication function independent of the emulator firmware 40 in the same manner as when images are transferred from the digital camera 33 to the computer for the purpose of displaying and printing the images.

Based on the image quality evaluation of the color image data 55, the user operates the emulator unit 42 through the emulator operating window 70 to modify and adjust various parameters to perform another parameter setting (step S2). The user then clicks the emulate button 71 of the emulator operating window 70. In response, an image processing execution instruction is transmitted to the emulator unit 42. The subsequent operations are repeated in the same manner as described above, so that parameter adjustment continues until the color image data 55 having desired image quality is obtained.

When the various parameters are determined in this manner, the determined parameters are written to the flash ROM 13 of the digital camera 33, thereby providing a digital camera having desired color image quality.

Further, the present invention is not limited to these embodiments, but various variations and modifications may be made without departing from the scope of the present invention.

What is claimed is:

1. A method of setting color processing parameters for a digital imaging apparatus, which includes an imaging device, a first memory, and a color processing unit, the method comprising:

connecting a computer via a communication path to the digital imaging apparatus;

setting, in the computer, tentative parameters for use in color processing;

transferring the tentative parameters from the computer to the digital imaging apparatus via the communication path;

storing the tentative parameters in a second memory in the digital imaging apparatus;

causing the color processing unit of the digital imaging apparatus to perform trial color processing based on the tentative parameters stored in the second memory under control of an emulator that operates in the digital imaging apparatus;

storing, in a third memory, color image data generated by the trial color processing based on the tentative parameters; and setting, in the first memory, the color processing parameters determined in response to the tentative parameters and the color image data, wherein the color processing unit is configured to perform color processing on an image taken by the imaging device based on the color processing parameters stored in the first memory, the first memory being different from the second memory.

2. The method as claimed in claim 1, further comprising setting, under the control of the emulator, values in registers referred to by the color processing unit, the values being responsive to the tentative parameters transferred from the computer to the digital imaging apparatus via the communication path.

3. The method as claimed in claim 1, further comprising setting again, in the computer, revised tentative parameters for use in color processing in response to the color image data.

4. The method as claimed in claim 1, wherein the emulator is implemented through execution of firmware by a processor of an image processing LSI provided in the digital imaging apparatus, the firmware stored in the first memory, and the first memory being a nonvolatile memory in the digital imaging apparatus.

5. The method as claimed in claim 1, wherein the second memory is a memory card attached to the digital imaging apparatus.

6. The method as claimed in claim 5, wherein the emulator reads the tentative parameters from the memory card for storage in a reference point to be referred to by the color processing unit before causing the color processing unit to perform trial color processing based on the tentative parameters under the control of the emulator operating in the digital imaging apparatus.

7. A digital imaging apparatus, comprising:
an imaging device;
a first memory;
a color processing unit configured to perform color processing; and
a processor configured to perform:
storing, in a second memory, tentative parameters for use in color processing received from a computer connected via a communication path;
causing the color processing unit within the digital imaging apparatus to perform trial color processing based on the tentative parameters stored in the second memory; and
storing, in a third memory, color image data generated by the trial color processing based on the tentative parameters,
wherein color processing parameters determined in response to the tentative parameters and the color image data are set in the first memory, and the color processing unit is configured to perform color processing on an image taken by the imaging device based on the color processing parameters stored in the first memory, the first memory being different from the second memory.

8. The digital imaging apparatus as claimed in claim 7, wherein the second memory is a memory card.

9. The digital imaging apparatus as claimed in claim 8, wherein the processor further performs reading the tentative parameters from the memory card for storage in a reference point to be referred to by the color processing unit before causing the color processing unit to perform the trial color processing based on the tentative parameters.

10. A digital imaging apparatus, comprising:
an imaging device;
a color processing unit configured to produce color image data by performing color processing on image data taken by the imaging device;
a nonvolatile memory;
a processor; and
an emulator firmware stored in the nonvolatile memory and configured to cause the processor to perform storing, in a second memory tentative parameters for use in color processing received from a computer connected via a communication path, causing the color processing unit within the digital imaging apparatus to perform trial color processing based on the tentative parameters stored in the second memory, and storing, in a third memory, color image data generated by the trial color processing based on the tentative parameters,
wherein color processing parameters determined in response to the tentative parameters and the color image data are set in the nonvolatile memory, and the color processing unit is configured to perform color processing on an image taken by the imaging device based on the color processing parameters stored in the nonvolatile memory, the nonvolatile memory being different from the second memory.

11. The digital imaging apparatus as claimed in claim 7, wherein the first memory is a nonvolatile memory.

12. The digital imaging apparatus as claimed in claim 7, wherein the second memory and the third memory are one and the same.

13. The method as claimed in claim 1, wherein the second memory and the third memory are one and the same.

14. The digital imaging apparatus as claimed in claim 10, wherein the second memory and the third memory are one and the same.

* * * * *